June 9, 1925.
C. M. SEMLER
1,541,594
VULCANIZING APPARATUS
Filed April 2, 1923
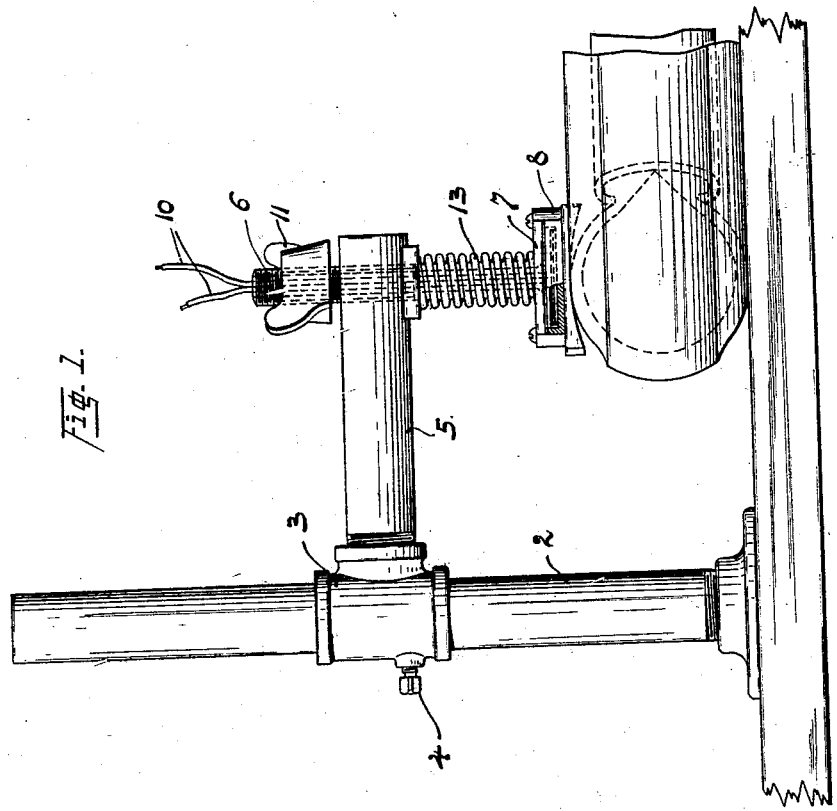
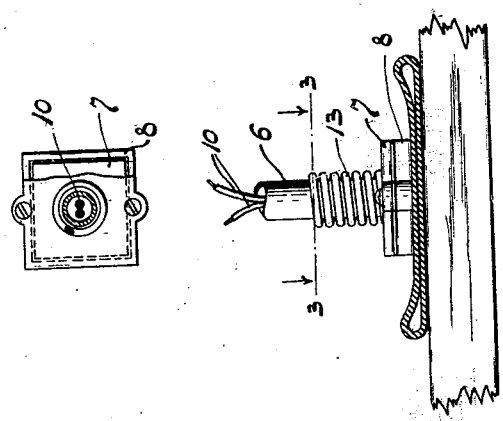
Inventor
Clyde M. Semler
By
Attorney Patented June 9, 1925.

1,541,594

UNITED STATES PATENT OFFICE.

CLYDE M. SEMLER, OF AKRON, OHIO.

VULCANIZING APPARATUS.

Application filed April 2, 1923. Serial No. 629,327.

*To all whom it may concern:*

Be it known that I, CLYDE M. SEMLER, a citizen of the United States, and a resident of Akron, county of Summit, State of Ohio, have invented certain new and useful Improvements in Vulcanizing Apparatus, of which the following is a specification.

This invention relates to apparatus for vulcanizing repairs in tires, tubes or the like, the object of the invention being to construct a simple and inexpensive device which can be used for such purposes.

The apparatus shown and described is particularly suitable for repairing small cuts in pneumatic tire casings, being so constructed that it can be used without removing the tire from the rim.

It is well known that small cuts in the tread or side walls of tires, if neglected, will collect pebbles, dirt and sand, which will chafe the tire and often times work into the tire, finally resulting in the destruction of the tire casing. With the repair equipment now on the market, the repairing of these small cuts is an expensive and laborious operation as it requires the same segmental mold which is used in making larger repairs. As a result, the expense of such repairs is so great that they are almost invariably neglected.

With equipment such as at present available on the market, the greater proportion of repair men will use one-fifth or larger circle molds to repair the smallest of cuts. This is not only injurious to the casing, due to over-curing the rubber thereof, but requires a greater expenditure of time and labor than the work ordinarily justifies. Furthermore, with the present equipment it is necessary to remove the tube from the tire and heat up the large segmental molds before the job can be started.

With these objections in mind, it is the purpose of my invention to construct a device which is suitable for repairing anything from a tube to a large pneumatic tire. Sufficient heat can be obtained in a few minutes to complete the repair job. An object of my invention is to provide for the repair of cuts on the outside of tires without deflating them, using the air pressure inside the tube in conjunction with a spring held pressure plate to obtain an even cure. In addition to these facts, my improved device applies heat and pressure on the same side of the tire, differing from prior devices that press the tire against a heated plate. The patch is applied while in view of the operator and the device is adjustable and can reach any point on the outside of the tire casing. The device uses an electrical heating element so that it can be attached to any light socket, and the heating and pressure element is movable toward and away from the work, a feature of importance in this class of work.

Other objects and advantages will be apparent from the description appended hereto, it being understood that the invention is not limited to the precise details as shown, but that changes and modifications may be made within the scope of the claims.

In the drawings:

Figure 1 is a side elevation of the device showing a tire being repaired thereon;

Figure 2 shows the device as used on a tube; and

Figure 3 is a section on the line 3—3 of Figure 2.

The device comprises a support or base plate 1 from which rises a standard 2 on which is slidably mounted a collar or sleeve 3 held in adjusted position by a screw 4. From the collar 3 extends a horizontal arm 5 in the outer end of which is slidably mounted a vertical stud or bolt 6 which is screw-threaded as shown and on the lower end of which is carried a head 7. On the lower end of the bolt 6 is a plate 8, the central portion of which is hollowed out to retain an electrical heating element 9. The bolt 6 is hollow so as to receive the wires 10 for the heating element.

Above the arm 5 on the bolt 6 is carried a wing nut 11 and between the head 7 and a washer 12, on the under side of the arm 5, is arranged a coil spring 13. A supplementary arcuate plate 14 may be placed between the plate 8 and the tire if a curved surface thereof is being operated on.

If a tire is to be repaired, the rubber patch is properly prepared and applied and the tire is then placed on the support 1, which is so designed that the tire can be placed at any angle so as to bring the part to be repaired uppermost. The nut 11 is then run down on the bolt until the spring is placed under considerable compression and the arm 5 is vertically adjusted to bring the plate at about the proper height. The nut 11 is backed off and the spring is allowed to exert its full pressure thereon. The plate is then heated and the repair is completed.

The device is adjustable for tube repairs as shown in Figure 2.

It will be seen that an extremely economical and serviceable outfit has been designed which is suitable for all kinds of tire and tube repairs. The heat and pressure are both applied from the same side of the tire and the work is always in view of the operator. By the use of this type of vulcanizer small cuts in the outer surface of the tire can be quickly and easily repaired.

What I claim is:

1. In a device for vulcanizing tires or tubes, a support for the object to be vulcanized, an arm extending over the support, a hollow stud mounted in said arm, a plate on the lower end of the stud, an electrical heating element in the plate, wires extending through the stud and connected to the heating element, yielding means adapted to press the object and plate together, and means for adjusting the support and the plate relatively to one another.

2. In a device for vulcanizing tires or tubes, a base plate for supporting the object to be vulcanized, a standard on said base plate, a vertically adjustable arm on the standard, a hollow stud loosely mounted in the end of the arm, a plate on the lower end of the stud, an electrical heating element in said plate, wires extending through the stud and connected to the heating element, and a spring surrounding the stud and adapted to press the plate against the object.

3. In a device for vulcanizing tires or tubes, a base plate for supporting the object to be vulcanized, a vertically adjustable arm on said base plate, a hollow stud slidably mounted in the end of the arm, a plate on the lower end of the stud, an electrical heating element in said plate, wires extending through the stud and connected to the heating element, and means to exert pressure on the plate.

CLYDE M. SEMLER.